(12) United States Patent
Moore et al.

(10) Patent No.: US 12,307,152 B2
(45) Date of Patent: May 20, 2025

(54) THUMBNAIL FOR DISAMBIGUATION IN A VISUAL SEARCH

(71) Applicant: Apple Inc., Cupertino, CA (US)

(72) Inventors: Thomas J Moore, Northglenn, CO (US); Alesha Unpingco, Milpitas, CA (US); Anshu K Chimalamarri, Sunnyvale, CA (US); Ashwin K Vijay, Sunnyvale, CA (US); Christopher D Fu, Fremont, CA (US); Guilherme Klink, Cupertino, CA (US); In Young Yang, Kirkland, WA (US); Paul Ewers, San Jose, CA (US); Paulo R Jansen dos Reis, San Jose, CA (US); Peter Burgner, Venice, CA (US); Thomas G Salter, San Francisco, CA (US); Tigran Khachatryan, North Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/640,553

(22) Filed: Apr. 19, 2024

(65) Prior Publication Data
US 2024/0393996 A1 Nov. 28, 2024

Related U.S. Application Data

(60) Provisional application No. 63/503,616, filed on May 22, 2023.

(51) Int. Cl.
*G06F 3/14* (2006.01)
*G06F 3/01* (2006.01)

(52) U.S. Cl.
CPC ............. *G06F 3/14* (2013.01); *G06F 3/012* (2013.01); *G06F 3/013* (2013.01); *G06F 3/017* (2013.01)

(58) Field of Classification Search
CPC . G06F 3/14; G06F 3/013; G06F 3/012; G06F 3/017; G06V 40/09; G06T 5/20
See application file for complete search history.

(56) References Cited

U.S. PATENT DOCUMENTS

| | | | |
|---|---|---|---|
| 9,734,402 B2 | 8/2017 | Jang et al. | |
| 9,874,998 B2 | 1/2018 | Woo et al. | |
| 10,048,782 B2 * | 8/2018 | Park | H04N 23/61 |
| 10,891,019 B2 * | 1/2021 | Bergsma | G06F 3/0482 |
| 11,068,531 B2 * | 7/2021 | Rahman | G06T 19/006 |
| 11,567,569 B2 * | 1/2023 | Spencer | G06V 10/751 |
| 12,141,851 B2 * | 11/2024 | Colteu | G06Q 30/0629 |

(Continued)

*Primary Examiner* — Mihir K Rayan
(74) *Attorney, Agent, or Firm* — Treyz Law Group, P.C.; Joseph F. Guihan

(57) ABSTRACT

A head-mounted device may be used to perform a visual search on a physical environment around the head-mounted device. A user may wish to visually search one out of multiple physical objects in the physical environment. To clearly show the user which physical object was the target of a visual search, the head-mounted device may present a thumbnail of the candidate physical object on a display. The thumbnail may be cropped and/or zoomed using an image from a camera on the head-mounted device. By displaying a thumbnail that is taken by a camera on the head-mounted device, the thumbnail will directly match the physical object in the user's physical environment, eliminating ambiguity regarding which physical object is the subject of the visual search.

21 Claims, 3 Drawing Sheets

(56) References Cited

U.S. PATENT DOCUMENTS

2013/0293580 A1* 11/2013 Spivack .................. G06F 3/017
                                                         345/633
2019/0042079 A1*  2/2019 Choi ..................... G06F 3/0488

* cited by examiner

THUMBNAIL FOR DISAMBIGUATION IN A VISUAL SEARCH

This application claims the benefit of U.S. provisional patent application No. 63/503,616, filed May 22, 2023, which is hereby incorporated by reference herein in its entirety.

BACKGROUND

This relates generally to electronic devices, and, more particularly, to electronic devices with cameras.

Some electronic devices such as head-mounted devices use cameras to perform visual searches on nearby physical objects. However, it may be difficult to distinguish which physical object is the target of a visual search.

SUMMARY

An electronic device may include one or more sensors, one or more displays, one or more processors, and memory storing instructions configured to be executed by the one or more processors, the instructions for selecting a subset of a physical environment for a visual search, obtaining, via a first subset of the one or more sensors, an image of the subset of the physical environment, and presenting, using the one or more displays, a thumbnail that includes the image of the subset of the physical environment.

DETAILED DESCRIPTION

Figure 1:
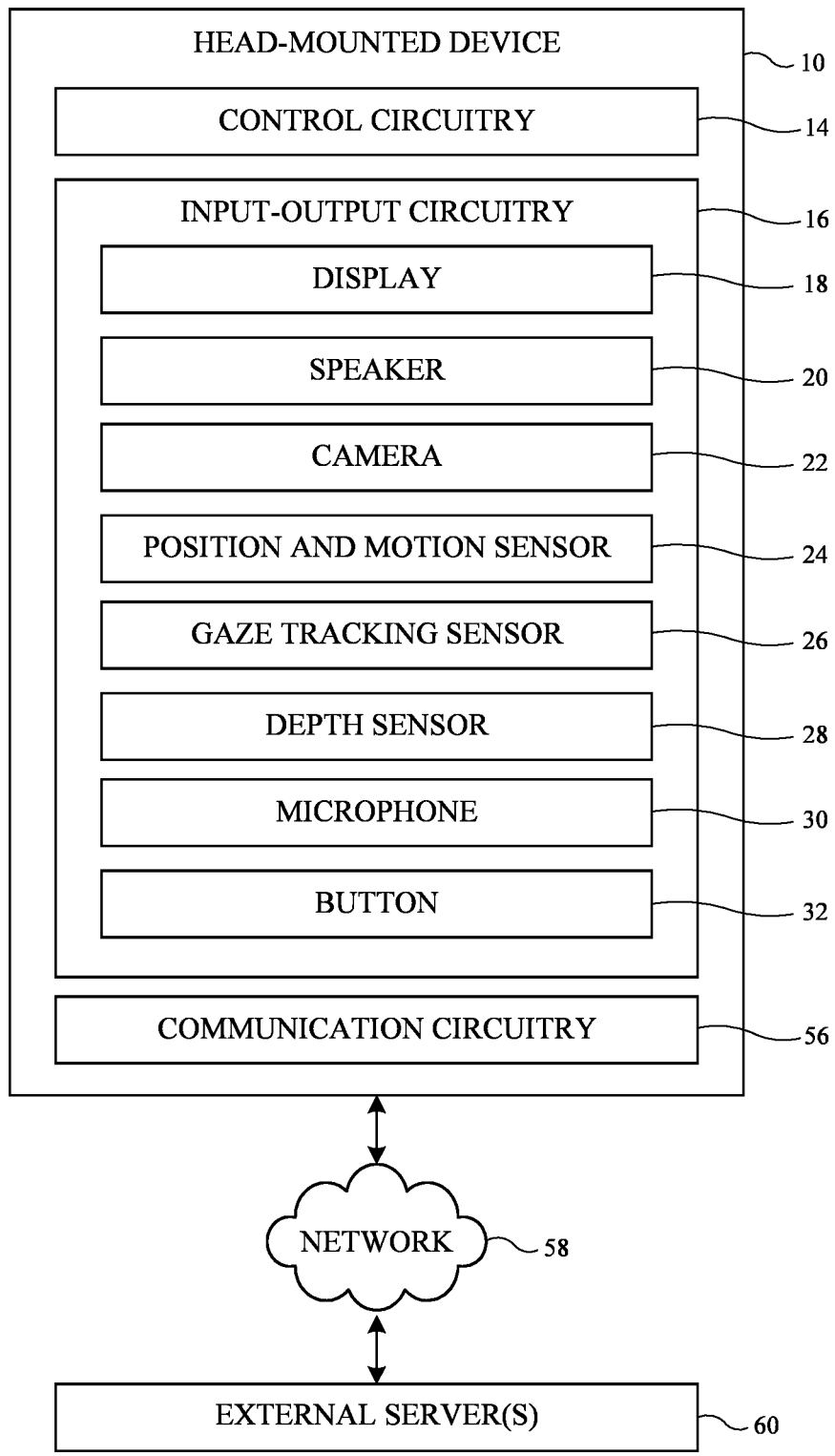
FIG. 1 is a schematic diagram of an illustrative electronic device in accordance with some embodiments.

Head-mounted devices may display different types of extended reality content for a user. The head-mounted device may display a virtual object that is perceived at an apparent depth within the physical environment of the user. Virtual objects may sometimes be displayed at fixed locations relative to the physical environment of the user. For example, consider an example where a user's physical environment includes a table. A virtual object may be displayed for the user such that the virtual object appears to be resting on the table. As the user moves their head and otherwise interacts with the XR environment, the virtual object remains at the same, fixed position on the table (e.g., as if the virtual object were another physical object in the XR environment). This type of content may be referred to as world-locked content (because the position of the virtual object is fixed relative to the physical environment of the user).

Other virtual objects may be displayed at locations that are defined relative to the head-mounted device or a user of the head-mounted device. First, consider the example of virtual objects that are displayed at locations that are defined relative to the head-mounted device. As the head-mounted device moves (e.g., with the rotation of the user's head), the virtual object remains in a fixed position relative to the head-mounted device. For example, the virtual object may be displayed in the front and center of the head-mounted device (e.g., in the center of the device's or user's field-of-view) at a particular distance. As the user moves their head left and right, their view of their physical environment changes accordingly. However, the virtual object may remain fixed in the center of the device's or user's field of view at the particular distance as the user moves their head (assuming gaze direction remains constant). This type of content may be referred to as head-locked content. The head-locked content is fixed in a given position relative to the head-mounted device (and therefore the user's head which is supporting the head-mounted device). The head-locked content may not be adjusted based on a user's gaze direction. In other words, if the user's head position remains constant and their gaze is directed away from the head-locked content, the head-locked content will remain in the same apparent position.

Second, consider the example of virtual objects that are displayed at locations that are defined relative to a portion of the user of the head-mounted device (e.g., relative to the user's torso). This type of content may be referred to as body-locked content. For example, a virtual object may be displayed in front and to the left of a user's body (e.g., at a location defined by a distance and an angular offset from a forward-facing direction of the user's torso), regardless of which direction the user's head is facing. If the user's body is facing a first direction, the virtual object will be displayed in front and to the left of the user's body. While facing the first direction, the virtual object may remain at the same, fixed position relative to the user's body in the XR environment despite the user rotating their head left and right (to look towards and away from the virtual object). However, the virtual object may move within the device's or user's field of view in response to the user rotating their head. If the user turns around and their body faces a second direction that is the opposite of the first direction, the virtual object will be repositioned within the XR environment such that it is still displayed in front and to the left of the user's body. While facing the second direction, the virtual object may remain at the same, fixed position relative to the user's body in the XR environment despite the user rotating their head left and right (to look towards and away from the virtual object).

In the aforementioned example, body-locked content is displayed at a fixed position/orientation relative to the user's body even as the user's body rotates. For example, the virtual object may be displayed at a fixed distance in front of the user's body. If the user is facing north, the virtual object is in front of the user's body (to the north) by the fixed distance. If the user rotates and is facing south, the virtual object is in front of the user's body (to the south) by the fixed distance.

Alternatively, the distance offset between the body-locked content and the user may be fixed relative to the user whereas the orientation of the body-locked content may remain fixed relative to the physical environment. For example, the virtual object may be displayed in front of the user's body at a fixed distance from the user as the user faces north. If the user rotates and is facing south, the virtual object remains to the north of the user's body at the fixed distance from the user's body.

Body-locked content may also be configured to always remain gravity or horizon aligned, such that head and/or body changes in the roll orientation would not cause the body-locked content to move within the XR environment. Translational movement may cause the body-locked content to be repositioned within the XR environment to maintain the fixed distance from the user. Subsequent descriptions of body-locked content may include both of the aforementioned types of body-locked content.

A schematic diagram of an illustrative electronic device is shown in FIG. 1. As shown in FIG. 1, electronic device 10 (sometimes referred to as head-mounted device 10, system 10, head-mounted display 10, etc.) may have control circuitry 14. In addition to being a head-mounted device, electronic device 10 may be other types of electronic devices such as a cellular telephone, laptop computer, speaker, computer monitor, electronic watch, tablet computer, etc.

Control circuitry 14 may be configured to perform operations in head-mounted device 10 using hardware (e.g., dedicated hardware or circuitry), firmware and/or software. Software code for performing operations in head-mounted device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Head-mounted device 10 may include input-output circuitry 16. Input-output circuitry 16 may be used to allow a user to provide head-mounted device 10 with user input. Input-output circuitry 16 may also be used to gather information on the environment in which head-mounted device 10 is operating. Output components in circuitry 16 may allow head-mounted device 10 to provide a user with output.

As shown in FIG. 1, input-output circuitry 16 may include a display such as display 18. Display 18 may be used to display images for a user of head-mounted device 10. Display 18 may be a transparent or translucent display so that a user may observe physical objects through the display while computer-generated content is overlaid on top of the physical objects by presenting computer-generated images on the display. A transparent or translucent display may be formed from a transparent or translucent pixel array (e.g., a transparent organic light-emitting diode display panel) or may be formed by a display device that provides images to a user through a transparent structure such as a beam splitter, holographic coupler, or other optical coupler (e.g., a display device such as a liquid crystal on silicon display). Alternatively, display 18 may be an opaque display that blocks light from physical objects when a user operates head-mounted device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 18 is opaque, the display may also optionally display entirely computer-generated content (e.g., without displaying images of the physical environment).

Display 18 may include one or more optical systems (e.g., lenses) (sometimes referred to as optical assemblies) that allow a viewer to view images on display(s) 18. A single display 18 may produce images for both eyes or a pair of displays 18 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules (sometimes referred to as display assemblies) that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Display 18 may include an organic light-emitting diode display or other displays based on arrays of light-emitting diodes, a liquid crystal display, a liquid-crystal-on-silicon display, a projector or display based on projecting light beams on a surface directly or indirectly through specialized optics (e.g., digital micromirror devices), an electrophoretic display, a plasma display, an electrowetting display, or any other desired display.

Input-output circuitry 16 may include various other input-output devices. For example, input-output circuitry 16 may include one or more speakers 20 that are configured to play audio and one or more microphones 30 that are configured to capture audio data from the user and/or from the physical environment around the user.

Input-output circuitry 16 may include one or more cameras 22. Cameras 22 may include one or more outward-facing cameras (that face the physical environment around the user when the electronic device is mounted on the user's head, as one example). Cameras 22 may capture visible light images, infrared images, or images of any other desired type. The cameras may be stereo cameras if desired. Outward-facing cameras may capture pass-through video for device 10. Cameras 22 may also include inward-facing cameras (e.g., for gaze detection).

As shown in FIG. 1, input-output circuitry 16 may include position and motion sensors 24 (e.g., compasses, gyroscopes, accelerometers, and/or other devices for monitoring the location, orientation, and movement of electronic device 10, satellite navigation system circuitry such as Global Positioning System circuitry for monitoring user location, etc.). Using sensors 24, for example, control circuitry 14 can monitor the current direction in which a user's head is oriented relative to the surrounding environment (e.g., a user's head pose). The cameras in cameras 22 may also be considered part of position and motion sensors 24. The cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique).

Input-output circuitry 16 may include a gaze-tracking sensor 26 (sometimes referred to as gaze-tracker 26, gaze-tracking system 26, gaze detection sensor 26, etc.). The gaze-tracking sensor 26 may include a camera and/or other gaze-tracking sensor components (e.g., light sources that emit beams of light so that reflections of the beams from a user's eyes may be detected) to monitor the user's eyes. Gaze-tracker 26 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 26 is merely illustrative.

Input-output circuitry 16 may include one or more depth sensors 28. Each depth sensor may be a pixelated depth sensor (e.g., that is configured to measure multiple depths across the physical environment) or a point sensor (that is configured to measure a single depth in the physical environment). Each depth sensor (whether a pixelated depth sensor or a point sensor) may use phase detection (e.g., phase detection autofocus pixel(s)) or light detection and ranging (LIDAR) to measure depth. Any combination of depth sensors may be used to determine the depth of physical objects in the physical environment.

Input-output circuitry 16 may include a button 32. The button may include a mechanical switch that detects a user press during operation of the head-mounted device. Alternatively, button 32 may be a virtual button that detects a user press using touch sensing.

Input-output circuitry 16 may also include other sensors and input-output components if desired (e.g., ambient light sensors, force sensors, temperature sensors, touch sensors, capacitive proximity sensors, light-based proximity sensors, other proximity sensors, strain gauges, gas sensors, pressure sensors, moisture sensors, magnetic sensors, audio components, haptic output devices such as actuators and/or vibration motors, light-emitting diodes, other light sources, etc.).

Head-mounted device 10 may also include communication circuitry 56 to allow the head-mounted device to communicate with external equipment (e.g., a tethered computer, a portable device, one or more external servers, or other electrical equipment). Communication circuitry 56 may be used for both wired and wireless communication with external equipment.

Communication circuitry 56 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

The radio-frequency transceiver circuitry in wireless communications circuitry 56 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHZ), a cellular low-midband (LMB) (e.g., 1400 to 1550 MHZ), a cellular midband (MB) (e.g., from 1700 to 2200 MHz), a cellular high band (HB) (e.g., from 2300 to 2700 MHZ), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHZ), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHZ), and/or any other desired communications bands.

The radio-frequency transceiver circuitry may include millimeter/centimeter wave transceiver circuitry that supports communications at frequencies between about 10 GHz and 300 GHz. For example, the millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, the millimeter/centimeter wave transceiver circuitry may support communications in an IEEE K communications band between about 18 GHz and 27 GHz, a $K_a$ communications band between about 26.5 GHz and 40 GHz, a Ku communications band between about 12 GHZ and 18 GHz, a V communications band between about 40 GHz and 75 GHz, a W communications band between about 75 GHz and 110 GHz, or any other desired frequency band between approximately 10 GHz and 300 GHz. If desired, the millimeter/centimeter wave transceiver circuitry may support IEEE 802.11ad communications at 60 GHZ (e.g., WiGig or 60 GHz Wi-Fi bands around 57-61 GHZ), and/or 5th generation mobile networks or 5th generation wireless systems (5G) New Radio (NR) Frequency Range 2 (FR2) communications bands between about 24 GHz and 90 GHz.

Antennas in wireless communications circuitry 56 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link and another type of antenna may be used in forming a remote wireless link antenna.

During operation, head-mounted device 10 may use communication circuitry 56 to communicate with one or more external servers 60 through network(s) 58. Examples of communication network(s) 58 include local area networks (LAN) and wide area networks (WAN) (e.g., the Internet). Communication network(s) 58 may be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol.

External server(s) 60 may be implemented on one or more standalone data processing apparatus or a distributed network of computers. External server 60 may provide information such as visual search information to head-mounted device 10 (via network 58) in response to information from head-mounted device 10.

Head-mounted device 10 may communicate with external server(s) 60 to obtain visual search information. For example, the head-mounted device may, in response to user input, send a visual search request to external server(s) 60. The visual search request may include various information for identifying a physical object near the head-mounted device (e.g., within the field-of-view of the user). The information transmitted by the head-mounted device for identifying a physical object may include images from one or more cameras on the head-mounted device, feature point information, depth information, and/or other desired information. The external server(s) may compare the received information to a database and identify if there is a match to a physical object in the database. When there is a match, the external server(s) may send information regarding the physical object (sometimes referred to as visual search information) to the head-mounted device. The head-mounted device may then present content to the user based on the visual search information.

The example of communicating with external server(s) 60 to conduct a visual search is merely illustrative. If desired, head-mounted device 10 may perform a visual search using information stored on the head-mounted device 10 (e.g., in memory of control circuitry 14).

Figure 2A:
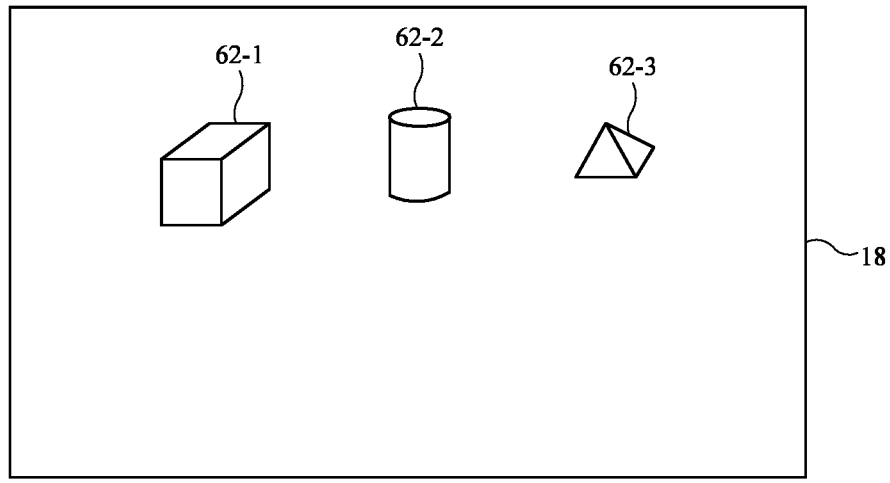
FIG. 2A is a view of physical objects through a display of an illustrative electronic device in accordance with some embodiments.

Head-mounted device 10 may be used to perform visual searches on physical objects in the physical environment around the head-mounted device. FIG. 2A is a view of physical objects 62-1, 62-2, and 62-3 as seen through display 18 in head-mounted device 10. While viewing physical objects 62-1, 62-2, and 62-3 through display 18, a user may request a visual search (e.g., by providing user input to an input device such as a microphone and/or button). In response to the request for the visual search, head-mounted device 10 may perform a visual search.

Sensor data from one or more sensors in head-mounted device 10 may be used to determine which physical object is the target of the user's visual search request. For example, the head-mounted device 10 may select a subset of the physical environment for the visual search using gaze detection information (e.g., the user may tend to search an area that is overlapped by their point of gaze), head pose information (e.g., the user may tend to search an area that is centered in their field of view), depth information (e.g., by identifying physical objects in a normal depth range for visual searches), user input, images from one or more cameras, etc.

The sensor data, the results of visual searches on one or more physical objects, and/or the user input by the user may be used to determine a hierarchy of the most likely targets for the visual search.

Consider an example where the viewer provides a voice command specifying "Perform a visual search on that object," or "what is that object?" In this case, the user has provided no clues as to which object out of physical objects 62-1, 62-2, and 62-3 is the target of the visual search. Continuing this example, the user may be gazing at physical object 62-1 while issuing the voice command. Therefore, physical object 62-1 may be determined to be the most likely target of the visual search and physical object 62-2 may be determined to be the second most likely target of the visual search.

As another example, the user may be pointing at physical object 62-1 (e.g., may perform a hand gesture identifying physical object 62-1) while (or shortly before/after) issuing the voice command. Therefore, physical object 62-1 may be determined to be the most likely target of the visual search and physical object 62-2 may be determined to be the second most likely target of the visual search.

As another example, the user's head pose may be centered at physical object 62-2 while issuing the voice command. Therefore, physical object 62-2 may be determined to be the most likely target of the visual search.

In some cases, the user may provide additional information that disambiguates between candidates for the visual search. Consider an example where the viewer provides a voice command specifying "Perform a visual search on the red object," or "what is that red object?" If physical object 62-1 is red, physical object 62-2 is green, and physical object 62-3 is blue, physical object 62-1 may be determined to be the most likely target of the visual search.

Image processing filters may be applied to images from camera(s) 22 to identify candidate physical objects for the visual search. The image processing filters may be applied to varying portions of the images from camera(s) 22. As one example, a first image processing filter may be applied to the entire image from camera 22. A second image processing filter may be applied to half of the image from camera 22 at a time. A third image processing filter may be applied to small portions (e.g., less than half) of the image from camera 22 at a time. The first image processing filter may detect large objects within the user's field-of-view, the second image processing filter may detect medium objects within the user's field-of-view, and the third image processing filter may detect small objects within the user's field-of-view. In one possible scheme, the image processing filters may be used to identify candidate physical objects for the visual search. Other input and/or sensor information (e.g., gaze detection information, head pose information, depth information, etc.) may be used to determine which of the candidate objects is most likely the user's desired target for the visual search.

To clearly show the user which object was the target of the visual search, a thumbnail image of the candidate physical object may be cropped from an image from camera 22 and presented on display 18. By displaying a thumbnail image that is taken by camera 22, the thumbnail image will directly match the physical object in the user's physical environment, eliminating ambiguity regarding which physical object is the subject of the visual search.

Figure 2B:
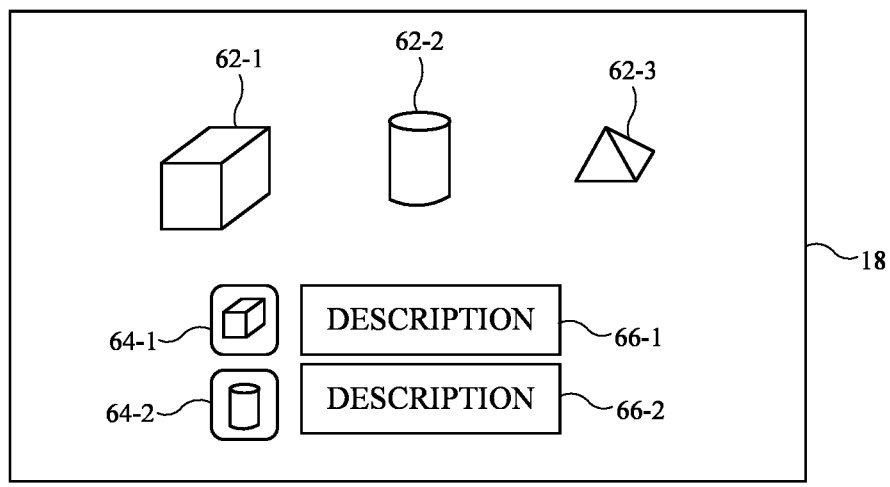
FIG. 2B is a view of physical objects and visual search results associated with the physical objects presented on a display of an illustrative electronic device in accordance with some embodiments.

FIG. 2B is a view of visual search results including thumbnail images associated with the physical objects presented on an illustrative display of an electronic device. As shown in FIG. 2B, similar to as in FIG. 2A, physical objects 62-1, 62-2, and 62-3 are visible through display 18. These three physical objects may be candidates for a visual search when the user requests a visual search.

In the example of FIG. 2B, physical object 62-1 is determined to be the most likely candidate subject of the visual search, followed by physical object 62-2. Accordingly, a thumbnail image 64-1 of physical object 62-1 is presented on display 18. A description 66-1 associated with physical object 62-1 may be presented adjacent to thumbnail 64-1.

Thumbnail 64-1 may be a fixed size. The portion of an image taken by camera 22 that includes physical object 62-1 may be cropped and/or zoomed (in or out) to match the fixed size of the thumbnail. The thumbnail may have a rectangular shape with rounded corners or any other desired shape.

Description 66-1 may include a description of the identified physical object, web content associated with the identified physical object, a notification associated with the identified physical object, application-specific content associated with the identified physical object, etc.

As previously mentioned, the second most likely subject of the visual search may be determined to be physical object 62-2. Accordingly, a thumbnail image 64-2 of physical object 62-2 is also presented on display 18. A description 66-2 associated with physical object 62-2 may be presented adjacent to thumbnail 64-2.

Thumbnail 64-2 may be a fixed size. The portion of an image taken by camera 22 that includes physical object 62-2 may be cropped and/or zoomed (in or out) to match the fixed size of the thumbnail. The thumbnail may have a rectangular shape with rounded corners or any other desired shape.

Description 66-2 may include a description of the identified physical object, web content associated with the identified physical object, a notification associated with the identified physical object, application-specific content associated with the identified physical object, etc.

The example in FIG. 2B of two thumbnails being displayed is merely illustrative. In general, any desired number of thumbnails 64 with visual search results (such as descriptions 66) may be displayed on display 18. Moreover, not all available thumbnails 64 need be displayed at the same time. For example, one or more thumbnails 64 associated with the object(s) determined to be the most likely subject of the visual search may be displayed. The head-mounted device 10 may present additional thumbnails 64 associated with other detected objects, optionally in decreasing order of likelihood, in response to a user input (e.g., a vocal command, gaze input, hand gesture, selection of an affordance, or the like). If head-mounted device 10 identifies only one likely candidate physical object for the visual search, there may be only one thumbnail displayed on display 18.

In some examples, head-mounted device 10 may additionally or alternatively present an affordance for an action that may be performed for an object associated with thumbnail 64. For example, in addition or alternatively to providing description 66 for an object associated with thumbnail 64, head-mounted device 10 may provide an option to share the thumbnail 64 and/or description 66 with another user, an option to purchase the physical object associated with thumbnail 64, or the like.

When multiple thumbnails (each corresponding to a different candidate physical object) are displayed on display 18, each thumbnail may be the same size. Alternatively, the thumbnail for the candidate physical object considered the most likely target of the visual search may be larger than the remaining thumbnails. In one possible scheme, the remaining thumbnails may all be the same size. In another possible scheme, the thumbnails may become progressively smaller as the likelihood of the associated physical object being the target physical object decreases.

The thumbnails displayed on display 18 may be head-locked content, as one example. Alternatively, the thumbnails may be world-locked content or body-locked content.

Herein, thumbnail may refer to a small or cropped version of a larger image of the user's physical environment and/or a small or cropped image of a subset of the user's physical environment. The small version of the larger image of the user's physical environment may be a scaled down version of the larger image of the user's physical environment and/or a cropped version of the larger image of the user's physical environment. As an example, each thumbnail may be a cropped version of a larger image of the user's physical environment such that each thumbnail image includes one candidate physical object. As another example, each thumbnail may be a small image of a candidate physical object.

As specific examples, each thumbnail may occupy less than 50% of the total display area when presented using display 18, less than 30% of the total display area when presented using display 18, less than 20% of the total display area when presented using display 18, less than 10% of the total display area when presented using display 18, less than 5% of the total display area when presented using display 18, less than 3% of the total display area when presented using display 18, etc.

When presented by display 18, each thumbnail may have an apparent size with an apparent length and width that are less than 60 centimeters, less than 50 centimeters, less than 40 centimeters, less than 30 centimeters, less than 20 centimeters, less than 10 centimeters, less than 5 centimeters, less than 3 centimeters, between 3 centimeters and 60 centimeters, between 5 centimeters and 30 centimeters, etc.

In some cases, visual search results such as thumbnails 64 and/or descriptions 66 may be presented on display 18 even when the user is targeting a physical object that is not overlapped by an active area of display 18 (from the perspective of the user). Consider an example where an active area of display 18 does not span the entire surface of display 18, such that head-mounted device 10 may not overlay virtual content on all portions of a physical environment visible to a user through display 18. Additionally, head-mounted device 10 may include an outward facing camera (e.g., camera 22) that has a field of view of greater than that of the active area of display 18 and a gaze-tracking sensor 26 capable of tracking the user's gaze in directions beyond the bounds of the active area of display 18. In these examples, the user may gaze at a physical object and trigger a visual search for the physical object. Head-mounted device 10 may determine that the user wishes to perform a visual search for the physical object based on the point of gaze overlapping the physical object. However, the point of gaze and/or physical object may not be overlapped by the active area of display 18. As such, the display 18 cannot overlay content directly over the physical object. However, the display may still present visual search results that identify the physical object. Presenting the thumbnail image that includes the physical object is a useful way to confirm to the user that the correct physical object was searched without overlaying virtual content directly on the physical object.

Figure 3:
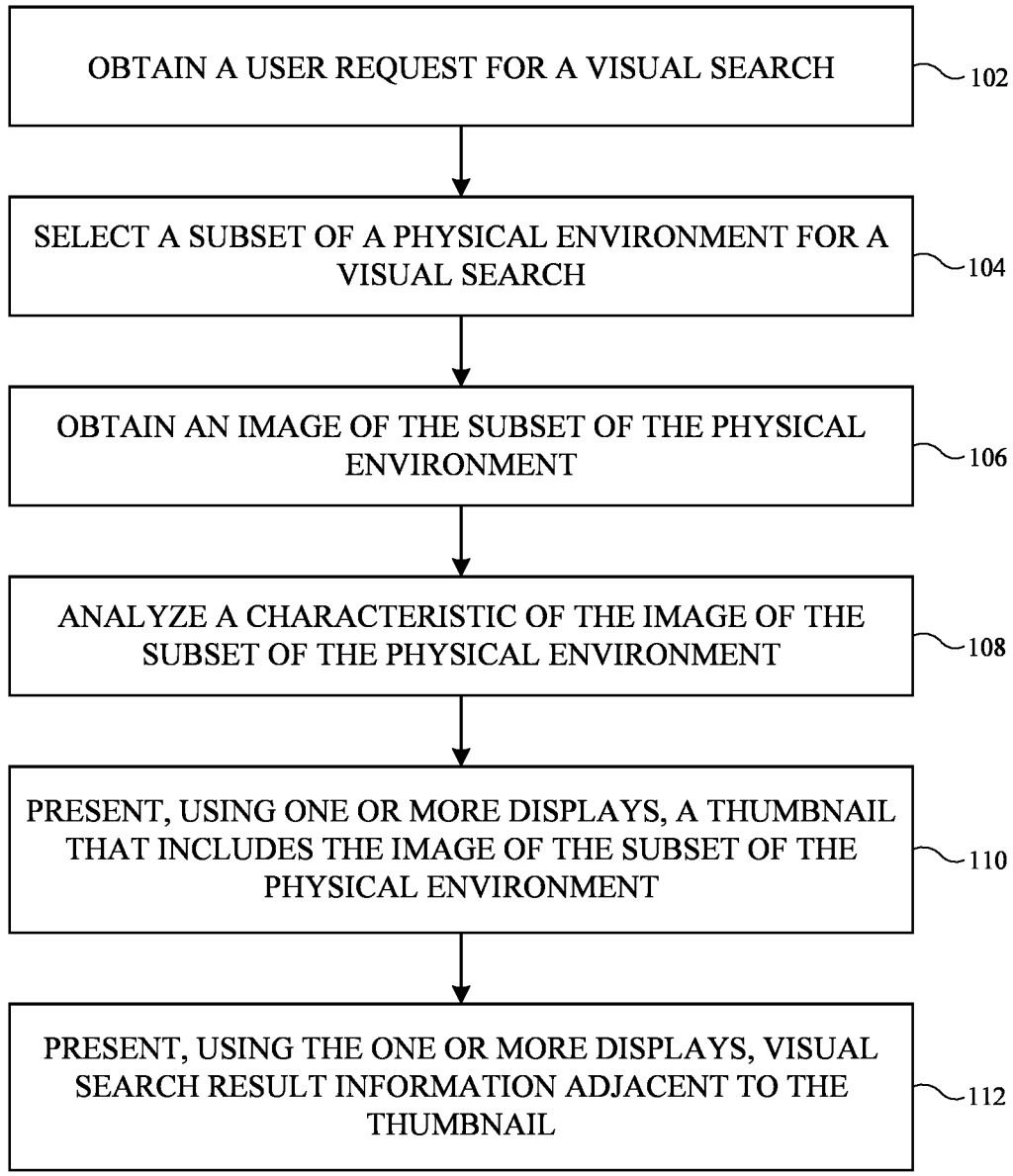
FIG. 3 is a flowchart showing an illustrative method for operating an electronic device that performs a visual search and presents content associated with the visual search in accordance with some embodiments.

FIG. 3 is a flowchart showing an illustrative method for operating an electronic device that performs a visual search and presents content associated with the visual search. At block 102, head-mounted device 10 may obtain a user request for a visual search. The head-mounted device 10 may receive user input that signals an intent for a visual search. The user input may include audio input (e.g., a voice command), a button press, gaze-based input, etc.

At block 104, head-mounted device 10 may select a subset of the physical environment for a visual search. The subset of the physical environment may be selected for the visual search based on gaze detection information (e.g., the user may tend to search an area that is overlapped by their point of gaze), head pose information (e.g., the user may tend to search an area that is centered in their field of view), depth information (e.g., by identifying physical objects in a normal depth range for visual searches), images from one or more cameras (e.g., to detect a hand gesture), etc.

At block 106, head-mounted device 10 may obtain an image of the subset of the physical environment. Camera 22 may capture the image of the subset of the physical environment. Camera 22 may capture an image of only the subset of the physical environment or camera 22 may capture a larger image that includes the subset of the physical environment and other portions of the physical environment. The larger image may be subsequently cropped if desired.

A characteristic of the image of the subset of the physical environment may be analyzed at block 108. The characteristic may be blurriness, contrast, type of content contained within the image (e.g., text, non-text, etc.), or another desired characteristic. If the characteristic is determined to be satisfactory (e.g., if the characteristic satisfies a criterion) at block 108 (e.g., if blurriness is lower than a threshold, if contrast is higher than a threshold, if the type of content is non-text, etc.), the method may proceed to block 110. If the characteristic is determined to be unsatisfactory (e.g., if the characteristic fails to satisfy a criterion) at block 110 (e.g., if blurriness is higher than a threshold, if contrast is lower than a threshold, if the type of content is text, etc.), the head-mounted device may forego presenting a thumbnail that includes the image of the subset of the physical environment.

At block 110, head-mounted device 10 may present a thumbnail that includes the image of the subset of the physical environment on display 18. An image from camera 22 may be cropped and/or zoomed (in or out) to obtain the thumbnail. The thumbnail may be presented as head-locked content.

At block 112, head-mounted device 10 may perform the visual search and may present visual search result information adjacent to the thumbnail using display 18. Head-mounted device 10 may use images captured by cameras 22 to perform the visual search. The images may be analyzed and compared to a database that is stored on head-mounted device 10 and/or a database on one or more external servers 60. Optical character recognition (OCR) may be performed when text is identified in the subset of the physical environment. The visual search may therefore identify one or more physical objects in the subset of the physical environment, may identify and recognize text in the subset of the physical environment, etc.

The visual search result information that is displayed at block 112 may include information identifying a physical object, a description of the identified physical object, web content associated with the identified physical object, a notification associated with the identified physical object, application-specific content associated with the identified physical object, etc. The visual search result information may be presented as head-locked content, body-locked content, and/or world-locked content.

If the characteristic of the image of the subset of the physical environment is determined to be unsatisfactory at block 108, a photograph associated with a physical object identified in the visual search may be presented on display 18. The photograph may be stored in head-mounted device 10 and/or obtained from external database(s) 60. The photograph may be presented in a thumbnail or using any other desired format.

As a specific example, a user wearing head-mounted device 10 may look at a houseplant and provide an audio command to trigger a visual search at block 102. At block 104, head-mounted device 10 selects a subset of the physical environment for the visual search that includes the houseplant due to one or more image processing filters identifying the houseplant as a candidate physical object for a visual search, the user's point of gaze overlapping the houseplant, a hand gesture (e.g., pointing) from the user identifying the houseplant, and/or the houseplant being aligned with the center of the user's field-of-view as determined using the user's head pose. At block 106, camera 22 may capture an image of the subset of the physical environment that includes the houseplant. The image of the subject of the physical environment may include or be derived from the same image or a different image than that used to select the subject of the physical environment at block 104. At block 108, head-mounted device 10 analyzes a characteristic (e.g., the blurriness) of the image of the subset of the physical environment. In response to determining that the characteristic is satisfactory (e.g., the blurriness of the image of the subset of the physical environment is sufficiently low), head-mounted device 10 presents a thumbnail that includes the image of the subset of the physical environment on display 18 at block 110. The image of the subset of the physical environment may be cropped and/or zoomed (in or out) to obtain the thumbnail. At block 112, visual search result information associated with the houseplant may be presented adjacent to the thumbnail. The visual search result information may include a name of the type of houseplant, a description of the houseplant, and a link to a website with instructions for how to care for the houseplant.

In response to determining that the characteristic is unsatisfactory at block 108 (e.g., the blurriness of the image of the subset of the physical environment is too high), head-mounted device 10 may forego presenting a thumbnail that includes the image of the subset of the physical environment on display 18 at block 110. Instead, head-mounted device 10 may present a photograph of the houseplant identified in the subset of the physical environment in response to determining that the characteristic is unsatisfactory at block 108. The photograph of the houseplant identified in the subset of the physical environment may be obtained using the internet. Other visual search result information associated with the houseplant may be presented adjacent to the photograph in this scenario.

As another example, a user wearing head-mounted device 10 may look at a menu and provide an audio command to trigger a visual search at block 102. At block 104, head-mounted device 10 selects a subset of the physical environment (e.g., a portion of the menu corresponding to the name of a dish) for the visual search due to one or more image processing filters identifying the name of the dish as a candidate physical object for a visual search, the user's point of gaze overlapping the name of the dish, a hand gesture (e.g., pointing) from the user identifying the name of the dish, and/or the name of the dish being aligned with the center of the user's field-of-view as determined using the user's head pose. At block 106, camera 22 may capture an image of the subset of the physical environment that includes the name of the dish. The image of the subject of the physical environment may include or be derived from the same image or a different image than that used to select the subject of the physical environment at block 104. At block 108, head-mounted device 10 analyzes a characteristic (e.g., type of content) of the image of the subset of the physical environment. In response to determining that the characteristic is unsatisfactory (e.g., the image of the subset of the physical environment contains text), head-mounted device 10 may forgo presenting a thumbnail that includes the image of the subset of the physical environment on display 18 at block 110. In this example, head-mounted device 10 may instead perform OCR on the text contained in the image, obtain an image corresponding to the text (e.g., an image of the dish from a local or remote database), and present the obtained image as a thumbnail on display 18. At block 112, visual search result information associated with the name of the dish may be presented adjacent to the thumbnail. The size of the visual search result information may be greater than the size of the thumbnail.

FIG. 3 describes an example where a single thumbnail is displayed on display 18. The subset of the physical environment for the visual search selected at block 104 may be the most likely candidate for the visual search. However, additional candidates for the visual search may also be searched and presented if desired. In general, the method of FIG. 3 may be repeated (or performed in parallel) for any desired number of subsets of the physical environment (with corresponding physical objects for visual searches). One thumbnail may be presented for each subset of the physical environment, with each thumbnail including an image of the respective subset of the physical environment. The thumbnails may all be the same size or the thumbnails may be different sizes (e.g., with decreasing size as the likelihood of the candidate being the user's desired target decreases). The thumbnails may be presented as head-locked content.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device comprising:
one or more sensors;
one or more displays;
one or more processors; and
memory storing instructions configured to be executed by the one or more processors, the instructions for:
selecting a subset of a physical environment for a visual search;
obtaining, via a first subset of the one or more sensors, an image of the subset of the physical environment;
presenting, using the one or more displays, a thumbnail that includes the image of the subset of the physical environment;
presenting, using the one or more displays, visual search result information adjacent to the thumbnail;
selecting an additional subset of the physical environment for an additional visual search;
obtaining, via the first subset of the one or more sensors, an additional image of the additional subset of the physical environment;
presenting, using the one or more displays and while presenting the thumbnail, an additional thumbnail that includes the additional image of the additional subset of the physical environment; and
presenting, using the one or more displays, additional visual search result information adjacent to the additional thumbnail.

2. The electronic device defined in claim 1, wherein the instructions further comprise instructions for:
obtaining, via a second subset of the one or more sensors, a user request for a visual search.

3. The electronic device defined in claim 1, wherein the instructions further comprise instructions for:
obtaining, via a third subset of the one or more sensors, sensor data, wherein selecting the subset of the physical environment for the visual search comprises selecting the subset of the physical environment for the visual search based on the sensor data.

4. The electronic device defined in claim 3, wherein the third subset of the one or more sensors comprises an outward-facing camera that is configured to detect a hand gesture, a gaze detection sensor that is configured to determine a point of gaze, or an accelerometer that is configured to obtain head pose information.

5. The electronic device defined in claim 1, wherein the one or more displays have an associated field-of-view and wherein the subset of the physical environment is outside of the field-of-view.

6. The electronic device defined in claim 1, wherein the instructions further comprise instructions for:
analyzing a characteristic of the image of the subset of the physical environment;
in response to determining that the characteristic fails to satisfy a criterion, foregoing presenting the thumbnail; and
in response to determining that the characteristic fails to satisfy a criterion, presenting a photograph associated with the visual search of the subset of the physical environment, the photograph different than the obtained image of the subset of the physical environment.

7. The electronic device defined in claim 1, wherein the instructions further comprise instructions for:
analyzing a characteristic of the image of the subset of the physical environment, wherein presenting the thumbnail comprises presenting the thumbnail in accordance with a determination that the characteristic satisfies a criterion.

8. A method of operating an electronic device that comprises one or more sensors and one or more displays, the method comprising:
selecting a subset of a physical environment for a visual search;
obtaining, via a first subset of the one or more sensors, an image of the subset of the physical environment;
presenting, using the one or more displays, a thumbnail that includes the image of the subset of the physical environment;
presenting, using the one or more displays, visual search result information adjacent to the thumbnail;
selecting an additional subset of the physical environment for an additional visual search;
obtaining, via the first subset of the one or more sensors, an additional image of the additional subset of the physical environment;
presenting, using the one or more displays and while presenting the thumbnail, an additional thumbnail that includes the additional image of the additional subset of the physical environment; and
presenting, using the one or more displays, additional visual search result information adjacent to the additional thumbnail.

9. The method defined in claim 8, further comprising:
obtaining, via a second subset of the one or more sensors, a user request for a visual search.

10. The method defined in claim 8, further comprising:
obtaining, via a third subset of the one or more sensors, sensor data, wherein selecting the subset of the physical environment for the visual search comprises selecting the subset of the physical environment for the visual search based on the sensor data.

11. The method defined in claim 10, wherein the third subset of the one or more sensors comprises an outward-facing camera that is configured to detect a hand gesture, a gaze detection sensor that is configured to determine a point of gaze, or an accelerometer that is configured to obtain head pose information.

12. The method defined in claim 8, wherein the one or more displays have an associated field-of-view and wherein the subset of the physical environment is outside of the field-of-view.

13. The method defined in claim 8, further comprising:
analyzing a characteristic of the image of the subset of the physical environment;
in response to determining that the characteristic fails to satisfy a criterion, foregoing presenting the thumbnail; and
in response to determining that the characteristic fails to satisfy a criterion, presenting a photograph associated with the visual search of the subset of the physical environment, the photograph different than the obtained image of the subset of the physical environment.

14. The method defined in claim 8, further comprising:
analyzing a characteristic of the image of the subset of the physical environment, wherein presenting the thumbnail comprises presenting the thumbnail in accordance with a determination that the characteristic satisfies a criterion.

15. A non-transitory computer-readable storage medium storing one or more programs configured to be executed by one or more processors of an electronic device that comprises one or more sensors and one or more displays, the one or more programs including instructions for:
- selecting a subset of a physical environment for a visual search;
- obtaining, via a first subset of the one or more sensors, an image of the subset of the physical environment;
- presenting, using the one or more displays, a thumbnail that includes the image of the subset of the physical environment;
- presenting, using the one or more displays, visual search result information adjacent to the thumbnail;
- selecting an additional subset of the physical environment for an additional visual search;
- obtaining, via the first subset of the one or more sensors, an additional image of the additional subset of the physical environment;
- presenting, using the one or more displays and while presenting the thumbnail, an additional thumbnail that includes the additional image of the additional subset of the physical environment; and
- presenting, using the one or more displays, additional visual search result information adjacent to the additional thumbnail.

16. The non-transitory computer-readable storage medium defined in claim 15, wherein the instructions further comprise instructions for:
- obtaining, via a second subset of the one or more sensors, a user request for a visual search.

17. The non-transitory computer-readable storage medium defined in claim 15, wherein the instructions further comprise instructions for:
- obtaining, via a third subset of the one or more sensors, sensor data, wherein selecting the subset of the physical environment for the visual search comprises selecting the subset of the physical environment for the visual search based on the sensor data.

18. The non-transitory computer-readable storage medium defined in claim 17, wherein the third subset of the one or more sensors comprises an outward-facing camera that is configured to detect a hand gesture, a gaze detection sensor that is configured to determine a point of gaze, or an accelerometer that is configured to obtain head pose information.

19. The non-transitory computer-readable storage medium defined in claim 15, wherein the one or more displays have an associated field-of-view and wherein the subset of the physical environment is outside of the field-of-view.

20. The non-transitory computer-readable storage medium defined in claim 15, wherein the instructions further comprise instructions for:
- analyzing a characteristic of the image of the subset of the physical environment;
- in response to determining that the characteristic fails to satisfy a criterion, foregoing presenting the thumbnail; and
- in response to determining that the characteristic fails to satisfy a criterion, presenting a photograph associated with the visual search of the subset of the physical environment, the photograph different than the obtained image of the subset of the physical environment.

21. The non-transitory computer-readable storage medium defined in claim 15, wherein the instructions further comprise instructions for:
- analyzing a characteristic of the image of the subset of the physical environment, wherein presenting the thumbnail comprises presenting the thumbnail in accordance with a determination that the characteristic satisfies a criterion.

* * * * *